(12) United States Patent
Michel et al.

(10) Patent No.: US 8,314,199 B2
(45) Date of Patent: Nov. 20, 2012

(54) HOMO- OR CO-POLYMERS OF ETHYLENE WITH COMBINATION OF PROCESSABILITY AND TOUGHNESS PROPERTIES

(75) Inventors: Jacques Michel, Feluy (BE); Marc Dupire, Hyon (BE); Prades Floran, Nivelles (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 137 days.

(21) Appl. No.: 12/530,500

(22) PCT Filed: Mar. 4, 2008

(86) PCT No.: PCT/EP2008/052623
§ 371 (c)(1),
(2), (4) Date: Mar. 31, 2010

(87) PCT Pub. No.: WO2008/113680
PCT Pub. Date: Sep. 25, 2008

(65) Prior Publication Data
US 2010/0222529 A1    Sep. 2, 2010

(30) Foreign Application Priority Data

Mar. 19, 2007    (EP) .................................... 07104426

(51) Int. Cl.
  C08F 4/6592    (2006.01)
  C08F 4/02      (2006.01)
  C08F 10/02     (2006.01)
  B01J 31/22     (2006.01)

(52) U.S. Cl. ........ 526/352; 526/129; 526/137; 526/160; 526/943; 502/103; 502/119; 502/120; 502/152

(58) Field of Classification Search .................. 502/103, 502/119, 120, 152; 526/129, 137, 160, 943, 526/352
See application file for complete search history.

(56) References Cited

U.S. PATENT DOCUMENTS 7,759,271 B2 *    7/2010    Prades et al. .................. 502/107

FOREIGN PATENT DOCUMENTS

| EP | 1749841 | 2/2007 |
|----|---------|--------|
| EP | 1749842 | 2/2007 |
| EP | 1857471 | 11/2007 |
| EP | 1903061 | 3/2008 |
| FR | 2769245 | 4/1999 |
| WO | WO2005/075525 | 8/2005 |

OTHER PUBLICATIONS

Wagner M H et al: "The Rheology of the Rheotens Test" 1998, Journal of Rheology, American Institutie of Physics, Easton, PA, US, pp. 917-928.
D. Yan, et al.; "Effect of Long Chain Branching on Rheological Properties of Metallocene Polyethylene"; Department of Chemical Engineering; McMaster University, Hamilton, Ontario, Canada L8S 4L7; Polymer 40 (1999); Mar. 24, 1999; pp. 1737-1744.

* cited by examiner

*Primary Examiner* — Caixia Lu

(57) ABSTRACT

The present invention discloses a homo- or co-polymer of ethylene characterised in that it combines the properties of:
  a) melt strength MS≧0.021 p-0.131 wherein melt strength MS is expressed in N and extruder head pressure p is expressed in MPa, when processed in a rheological extruder through a die with L/D of 30:2 at a rate of 500 $s^{-1}$ and at temperature of 190° C.;
  b) long chain branching index g' determined by SEC-VISCO larger than 0.90;
  c) polydispersity index (Mw/Mn) of at most 7.
It also discloses a method to prepare said polyethylene resin.

13 Claims, 1 Drawing Sheet

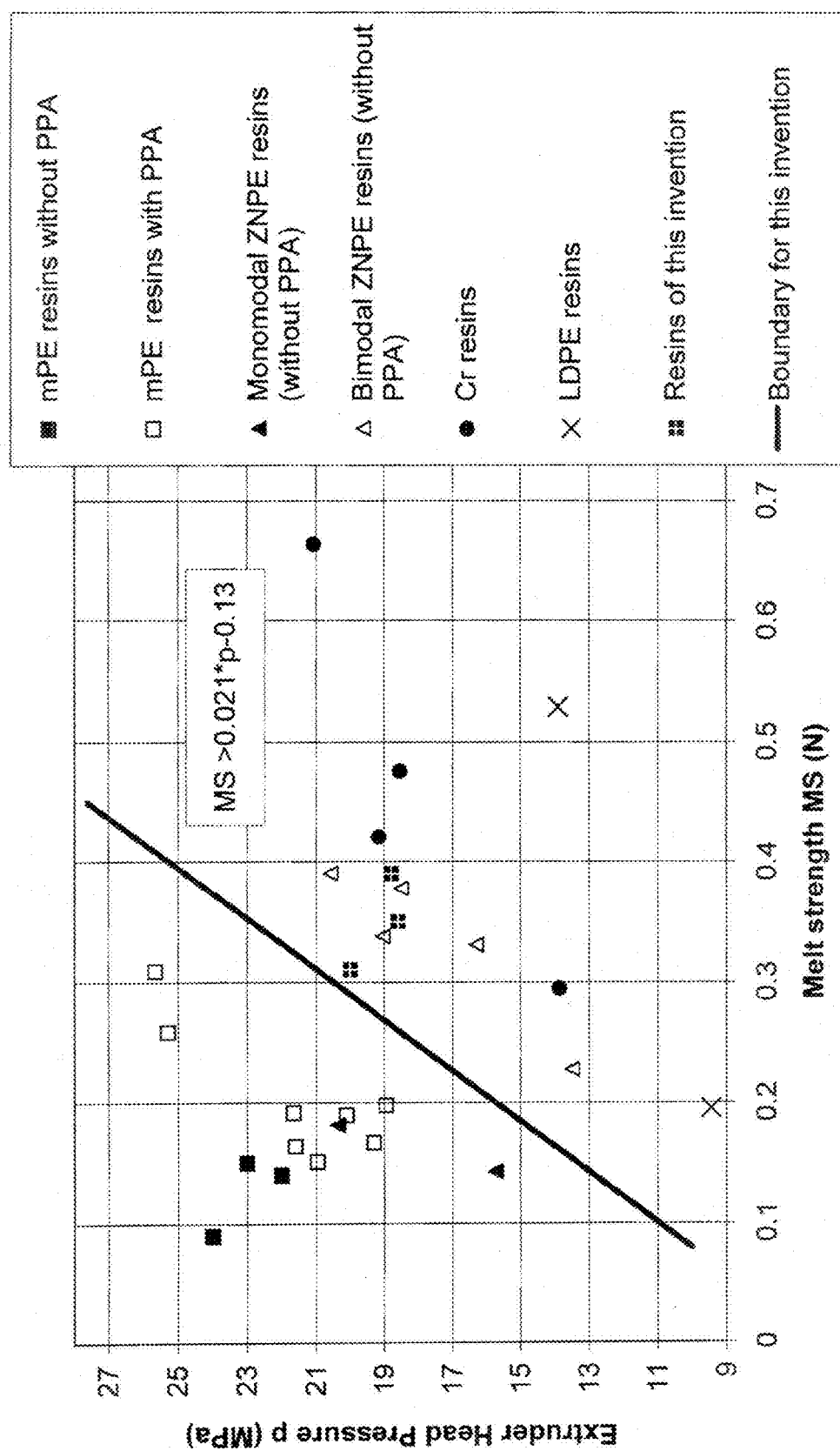

HOMO- OR CO-POLYMERS OF ETHYLENE WITH COMBINATION OF PROCESSABILITY AND TOUGHNESS PROPERTIES

CROSS-REFERENCE TO RELATED APPLICATIONS

This application claims the benefit of PCT/EP2008/052623, filed Mar. 4, 2008, which claims priority from EP 07104426.7, filed Mar. 19, 2007.

This invention relates to a new class of polyethylene resins prepared with single site catalyst systems exhibiting unusual combination of good processability, toughness, slow crack growth resistance and optical properties.

Good melt processing of polyethylene is generally associated with high throughput at given extruder RPM, low specific mechanical energy, low amps, low torque, absence of surface defects and melt fracture for high shear rate, high melt strength and low extruder head pressure. Good processing is generally achieved at the expense of mechanical and optical properties.

There are many types of polyethylene (PE) resins produced in single reactors. None of them however combine processing-ease, good mechanical and good optical properties. The commonly used PE resins can be described as follows.

1. Low density polyethylene (LDPE), that contains a large amount of long chain branches (LCB), typically has excellent processing, excellent-to-good optics but poor resistance to crack propagation such as for example poor tear resistance and poor dart impact strength. Furthermore, it is commercially limited to the narrow density range of 0.910 to 0.930 g/cm$^3$, thereby implying limited rigidity or down gauging. In addition, LDPE is produced with a high-pressure process that is technically more demanding than other industrial low-pressure processes.
2. Chromium oxide-based polyethylene (CrPE), that has few long chain branches, has good-to excellent processing but has poor optics and fair-to-good mechanical properties.
3. Ziegler-Natta polyethylene (ZNPE), that has usually no or negligible amount of LCB, has fair processing performance, good mechanical properties and fair to good optical properties.
4. Single-site linear metallocene-produced polyethylene (mPE) has excellent optical and mechanical properties but poor processing ease. Addition of processing aids and/or of LDPE is required for extrusion grades having a melt flow index MI2 of less than 2 dg/min. Single site means homogeneous composition (both intra and inter molecular comonomer) distribution within the macromolecules. Metallocene prepared PE resins containing LCB as determined by $^{13}$C NMR or solution techniques do not form a single family and can behave quite differently.

Bis-tetrahydroindenyl catalyst systems have been used extensively to prepare polyethylene resins because of their good response to hydrogen and their good ability to incorporate comonomers. They can be used to prepare resins having a bimodal molecular weight distribution suitable for the preparation of pipes.

Processing may be improved by several well known methods:
  Broadening the molecular weight distribution by using cascade reactors, or by blending in extruder, or by using dual single site catalysts with different responses to hydrogen as chain transfer agent. This can be achieved for components having narrow or medium molecular weight distribution such as metallocene produced polyethylene (mPE) having a polydispersity index PI between 2 and 3 or with Ziegler-Natta polyethylene (ZNPE) having a polydispersity index PI between 4 and 8. Blending can typically bring dispersion problems such as inclusion of high molecular weight polyethylene and it is costly. This dispersion problem is especially noticeable when blending narrow molecular weight distribution components. Furthermore, the films produced from such resins having a broadened molecular weight distribution are hazy.
  Adding processing aids. This leads to a drop of extruder head pressure and of specific energy required for extrusion. Melt strength is less affected. Adding polymer processing aid (PPA) allows extrusion at high throughput without melt fracture.
  Ionising or extruding with peroxides or controlled amount of oxygen, efficiency being function of residual double bond concentration. Aside from the added cost, numerous side effects are usually encountered, such as for example increase of gel content, worsening of mechanical properties, development of colour and odours.
  Blending with low density polyethylene (LDPE) having high melt strength. This method also leads to a drop of mechanical properties.

There is thus still a need for resins that can be processed easily and offer simultaneously good optical and good mechanical properties.

It is an aim of the present invention to prepare polyethylene resins that can be processed easily and which have high shear thinning capability, high viscosity at low shear rates and high melt strength combined with low extrusion head pressure It is another aim of the present invention to prepare polyethylene resins that have good mechanical properties.

It is yet a further aim of the present invention to prepare polyethylene resins having good stress crack resistance such as measured for example by Environmental Stress Crack Resistance (ESCR) or Full Notch Creep Test (FNCT).

It is yet another aim of the present invention to prepare polyethylene resins having good impact strength.

It is also an aim of the present invention to prepare polyethylene resins that have good optical properties.

Any one of these aims is at least partially fulfilled by the present invention.

Accordingly, the present invention discloses a single site homo- or co-polymer of ethylene combining simultaneously the properties of:
  a) melt strength MS≧0.021 p−0.131 wherein melt strength MS is expressed in N and extruder head pressure p is expressed in MPa, when processed in a rheological extruder through a die with L/D of 30:2 at a rate of 500 s$^{-1}$ and at temperature of 190° C.;
  b) long chain branching index g' determined by SEC-VISCO larger than 0.90;
  c) polydispersity index (Mw/Mn) of at most 7.

In a more preferred embodiment according to the present invention, the single site homo- or co-polymer of ethylene additionally exhibits any one or more of the following properties:
1) rheology long chain branching index $g_{rheo}$ smaller than that of monomodal polyethylene resins prepared with a conventionally supported bridged unsubstituted bistetrahydroindenyl catalyst system having the same weight average molecular weight Mw, a smaller $g_{rheo}$ indicating a higher level of long chain branching and wherein $g_{rheo}$ is defined by the ratio;

2) shear thinning index $SR_{ET4}$, defined as the ratio of shear viscosity at 0.1 rad/s to that at 500 rad/s, greater than that of monomodal polyethylene resins prepared with a conventionally supported bridged unsubstituted bistetrahydroindenyl catalyst system having the same HLMI value.
3) melt strength $MS \geqq 0.021*p-0.13$ wherein melt strength MS is expressed in N and pressure p is expressed in MPa. For this purpose, on-line melt strength measurements are performed on a Brabender extruder single screw with a mixing pin (L:D ratio of 25, a diameter of 19 mm and a compression ratio of 4:1) equipped with a Göttfert Rheotens 71-97 take-off accessory when extruding through a die with a ratio L/D of 15 and a diameter D of 2 mm, at a rate of 500 $s^{-1}$ and at temperature of 190° C.; Melt strength experiments are similar to those recommended by Wagner et al. (M. H. Wagner, V. Schulze, and A. Göttfert, 'Rheotens-mastercurves and drawability of polymer melts', Polym. Eng. Sci. 36, 925, 1996). They are carried out at extrusion temperature of 190° C., spinline length of 100 mm, acceleration of 30 mm/$s^2$, gear spacing of 0.4 mm, capillary die with length-to-diameter ratio of 30/2 mm with tapered entrance angle of 40°. Melt strength and extruder head pressure are obtained by interpolation from data collected at variable shear rates covering broadly the shear rate range 150 to 900 s−1, with exact boundaries being function of melt viscosity;
4) viscosity long chain branching index g' larger than 0.90 corresponding to less than 3C/10,000C;
5) polydispersity index (Mw/Mn) of at most 7, preferably of at most 6;
6) polydispersity index (Mz/Mw) of the z-average molecular weight Mz to the weight average molecular weight Mw, smaller than 4, preferably smaller than 3.5;
7) impact strength larger than that of a polyethylene resin of same melt index HLMI and same density either prepared with a chromium oxide-based catalyst system or with a low density polyethylene prepared by a high pressure process;
8) Environmental Stress Crack Resistance (ESCR) larger than that of polyethylene resin of same density and same melt index HLMI prepared either with a chromium oxide-based catalyst system or with a conventionally supported unsubstituted bridged bistetrahydroindenyl catalyst system;
9) Full Notch Creep Test (FNCT) resistance larger than that of monomodal polyethylene resins of same density and same melt index HLMI prepared either with a chromium oxide-based catalyst system or with a conventionally supported bridged unsubstituted bistetrahydroindenyl catalyst system.

All these properties are measured on polyethylene resins free of polymer processing aid (PPA).

The present invention also discloses a method for preparing a single site homo- or co-polymer of ethylene that comprises the steps of:
a) providing a bis-tetrahydroindenyl metallocene component;
b) depositing the component of step a) on a fluorinated activating support to prepare an active catalyst system wherein the fluorinated activating support is obtainable by a method such as described in patent WO2005/075525 at pages 5, line 1 to page 9, line 10 or in U.S. Pat. No. 6,239,059 at col. 2, line 1 to col. 5, line 18;
c) injecting the active catalyst system of step b) into a single reactor;
d) optionally adding a cocatalyst,
e) injecting ethylene and an optional comonomer into the single reactor at any time before, after or simultaneously with the active catalyst system;
f) maintaining under polymerising conditions;
g) retrieving a polyethylene resin.

The bis-tetrahydroindenyl component is represented by formula I

$$R''(H_4Ind)_2MQ_2 \quad (I)$$

wherein
($H_4$Ind) is substituted or unsubstituted tetrahydroindenyl;
R" is a structural bridge between the two indenyls to impart stereorigidity that comprises a $C_1$-$C_4$ alkylene radical, a dialkyl germanium or silicon or siloxane, or a alkyl phosphine or amine radical, which bridge is substituted or unsubstituted;
M is a metal Group 4 of the Periodic Table;
Q is hydrogen, halogen, hydrocarbyl or hydrocarboxyl.

In formula (I), each tetrahydroindenyl group may be substituted in the same way or differently from one another at one or more positions in the cyclopentadienyl ring, the cyclohexenyl ring and the bridge.

In formula (I), each substituent on the tetrahydroindenyl may be independently chosen from those of formula $XR_v$, in which X is chosen from group IVA, oxygen and nitrogen and each R is the same or different and chosen from hydrogen or hydrocarbyl of from 1 to 20 carbon atoms and v+1 is the valence of X. X is preferably C. If the cyclopentadienyl ring is substituted, its substituent groups must not be so bulky as to affect coordination of the olefin monomer to the metal M. Substituents on the cyclopentadienyl ring preferably have R as hydrogen or $CH_3$. More preferably, at least one and most preferably both cyclopentadienyl rings are unsubstituted.

Preferably, if present, the substituents on the tetrahydroindenyl groups are in positions 2 and/or position 4 with a small substituent, such as methyl, at position 2 and a bulky substituent, such as t-butyl or phenyl, at position 4. More preferably, the tetrahydroindenyl groups are unsubstituted.

Preferably, the bridge is a C1-C4 alkylene radical more preferably selected from $Me_2C$, $Ph_2C$ or a silyl bridge more preferably $Me_2Si$. The most preferred bridge is $Me_2C$.

Preferably M is selected from Zr, Ti, Hf or V. More preferably it is Zr.

Each Q is the same or different and may be a hydrocarbyl or hydrocarboxyl radical having 1 to 20 carbon atoms or a halogen. Suitable hydrocarbyls include aryl, alkyl, alkenyl, alkylaryl or arylalkyl. Both Q are preferably the same and are halogen, more preferably chlorine.

The most preferred bis-tetrahydroindenyl component is ethylene-bis-tetrahydroindenyl zirconium dichloride.

The bis-tetrahydroindenyl catalyst component is then deposited on and reacted with an activating support, wherein said activating support is prepared as described in patent WO2005/075525 and in patent FR-A-2769245.

The activating support is obtainable by the steps of:
a) providing a support prepared from one or more porous mineral oxides;
b) optionally heating the support under inert gas;
c) functionalising the support with a solution containing an alkylating agent;
d) heating the functionalised support of step c) under an inert gas and then under oxygen;
e) fluorinating the support with a solution containing a fluorinating agent;
f) retrieving an active fluorinated support.

Optionally the functionalisation and the fluorination steps can be carried out in one step, before heating step d), by providing an appropriate solution containing a functionalising and fluorinating agent.

The porous mineral oxide is advantageously chosen from silica, alumina and mixtures thereof. Preferably it is silica.

h) In a first embodiment according to the present invention, functionalisation and fluorination are carried out as two separate steps. The activating supports are then formed by the reaction of —OH radicals carried by the support base particles with at least one functionalisation agent. Any functionalisation agent or mixture thereof described in patent WO2005/075525 at pages 5, line 1 to page 9, line 10 or in U.S. Pat. No. 6,239,059 at col. 2, line 1 to col. 5, line 18 can be used in the present invention.

In a preferred embodiment of the present invention, the functionalisation step is carried out by treating a suspension of the support particles in a solvent medium containing the functionalisation agent at a temperature ranging from −150 to +150° C. for a period of time ranging from 1 minute to 12 hours, and then by recovering the grafted particles after washing. The solvent is preferably selected from aliphatic, alicyclic and aromatic hydrocarbons. Preferably, the treatment is carried out at a temperature of from 30 to 100° C. and for a period of time of from 1 to 3 hours. Preferably the concentration of functionalisation agent is of from 0.5 to 20 mmol per g of support particles.

After the functionalisation step, a heat treatment in an inert gas (such as argon or nitrogen) is carried out, preferably in a fluidised bed. The heat treatment is used to remove the organic residues present on the surface and created by the functionalisation agent. This heat treatment, or pyrolysis, is advantageously carried out at a temperature of from 200 to 600° C., preferably of from 350 to 500° C. and more preferably of about 450° C., for a period of time of from 1 to 10 hours.

The oxidation treatment may advantageously consist of a heat treatment of the functionalised support particles, in a fluidised bed under oxygen, at a temperature of from 200 to 600° C., preferably of from 350 to 500° C. and more preferably of about 450° C., for a period of time of from 1 to 10 hours. This treatment increases the acidity of the support surface and, consequently, the performance of the catalytic system.

The functionalised support is then treated with a fluorinating agent that partially replaces the radicals of the functionalising agent with fluor. The fluorination treatment may be carried out by bringing the functionalised support particles into contact with gaseous hydrofluoric acid. This contacting step is carried out for a period of time ranging from 1 minute to 24 hours, at a temperature of from 20 to 800° C. Alternatively, hydrofluoric acid may advantageously be replaced by powdered $(NH_4)_2SiF_6$; the fluorination treatment with $(NH_4)_2 SiF_6$ is carried out by gently fluidising the mixture of support particles and $(NH_4)_2SiF_6$ under an inert gas, such as argon or nitrogen, and by submitting to a heat treatment at a temperature of from 300 to 500° C. for a period of time of from 1 to 10 hours. An amount of fluorine of from 1 to 10% by weight based on the total weight of the support is used for the fluorination treatment. Preferably, the minimum amount of fluorine is 3 wt %. Preferably the maximum amount of fluorine is 7% by weight, more preferably 6 wt % and most preferably 5 wt %.

In a second embodiment according to the present invention, the fluorination step is suppressed and the support is treated with a compound comprising at least one aluminium, one fluor and one organic group, optionally in combination with any one or more compounds selected from $M''F$, $M''R^p$, $M'F_2$, $M'R^pF$, or $M'R^p{}_2$ wherein $M''$ is a group 1 metal, $M'$ is a group 2 metal and $R^p$ is an alkyl having from 1 to 20 carbon atoms. The organic group is preferably hydrocarbyl and more preferably an alkyl having from 1 to 12 carbon atoms. Preferably, the functionalisation and fluorination agent is of formula (II)

$$Al(R'')_2F \qquad (II)$$

wherein the $R''$ groups, can be the same or different and are alkyl groups having from 1 to 20 carbon atoms. Preferably, $R''$ is methyl, ethyl, butyl and hexyl, and more preferably the $R''$ groups are the same. The most preferred compound of formula (I) is diethylaluminiumfluoride.

Fluorinated alkylaluminum can be obtained as described in H. Roesky review, *Journal of Fluorinated Chemistry*, 2003, 122, 125.

The functionalisation agent can be used alone or in combination with any one or more groups selected from $M''F$, $M''R^p$, $M'F_2$, $M'R^pF$ or $M'R^p{}_2$ wherein $M''$ is a group 1 metal, preferably Na, $M'$ is a group 2 metal, preferably Mg and $R^p$ is an alkyl having from 1 to 20 carbon atoms.

The functionalised support is then subjected to a thermal treatment and an oxygen treatment similar to that described here-above for the first embodiment. Detailed description of the methods that can be used in the present invention to prepare the activating support are fully disclosed in patent WO2005/075525 at pages 5, line 1 to page 9, line 10 or in U.S. Pat. No. 6,239,059 at col. 2, line 1 to col. 5, line 18;

Polymerisation is carried out in a single reactor with the activated single site catalyst system of the present invention, resulting in a monomodal polyethylene product.

The comonomer, if present can be selected from alkenes having from 3 to 8 carbon atoms such as for example propylene, butene, pentene, hexene, octene.

One or more aluminiumalkyl(s) can be used as scavengers in the reactor. They are typically represented by formula $AlR_3$ wherein each R is the same or different and is selected from halides or from alkoxy or alkyl groups having from 1 to 12 carbon atoms. Especially suitable aluminiumalkyl is trialkylaluminium, the most preferred being triisobutylaluminium (TIBAL).

Further, the catalyst may be prepolymerised prior to introducing it in the reaction zone and/or prior to the stabilisation of the reaction conditions in the reactor.

The polymerisation temperature ranges from 20 to 125° C., preferably from 60 to 95° C. and the pressure ranges from 0.1 to 5.6 MPa, preferably from 2 to 4 MPa. The polymerisation time ranges from 10 minutes to 4 hours, preferably from 1 and 2.5 hours.

The resins of the invention exhibit rheological features that can be attributed to the presence of long chain branching. Amongst those features, one can cite
- an exceptional enhancement of low shear rate viscosity with respect to linear polyethylene. This includes extrapolated zero-shear rate viscosity at a given weight-average molecular weight;
- high pseudo-plastic character represented by high shear thinning as translated by a high ratio of low to high shear viscosities;
- strain-hardening in transient elongational viscosity tests.

At the same time, the polyethylene resins of this invention have negligible amount of long chain branching as detected by classical solution techniques such as size exclusion chromatography combined with on-line viscosity detector. The average weight ratio of intrinsic viscosities of branched to linear macromolecules g' is close to one.

Without being bound by a theory, it is believed that polyolefins of this invention have few long chain branched macromolecules but the arms of the long chain branched macromolecules are very long and may interact efficiently with other high molecular mass macromolecules. In addition, it is also believed that long chain branching topology of the resins of this invention is different from actual topology of branched polyolefins. Recent articles for example by Kapnistos et at (M. Kapnistos, G. Koutalas, N. Hadjichristidis, J. Roovers, D. J. Lohse, and D. Vlassopoulos in Rheol. Acta 46, 273, 2006), or by Gabriel and Auhl (C. Gabriel, and D. Auhl, Polymer Preprints, 44 (2), 27, 2003) show that theory and experiments can help decipher the kind of topology such as H or pom-pom structures, comb-like, star-like and dendrimer-like structures and/or combinations thereof. We are however far from quantitative assessment of the topology in an unambiguous fashion.

All of the above characteristics of molecular structure entail on the polyolefins of the present invention very long relaxation mechanisms in the melt that can be quantified by classical rheological experiments. As a result of the presence of long relaxation times and a broad distribution of relaxation times, the effects on rheological properties of practical interest are maximised. By rheological properties of practical interest, one can cite a high zero-shear viscosity combined with high shear-thinning behaviour that result in good sagging resistance and low extruder head pressure. Also melt strength is known to increase with increasing zero shear viscosity in polyethylene as discussed for example by Ghijsels et al. (A. Ghijsels, J. J. S. M. Ente, and J. Raadsen, in Intern. Polymer Processing V (4), 284, 1990) and a high melt strength is associated with good bubble stability in film blowing as explained in Ghijsels et al. (A. Ghijsels, ibid., M. Fleissner, in Intern. Polymer Processing, II (3/4), 229, 1988), or by Münsted et al. (H. Münsted, T. Steffl and A. Malmberg, in Rheol. Acta, 45, 14, 2005).

Throughout this description, long chain branching (LCB) means chains long enough for entanglements to occur.

In order to quantify LCB concentration with rheology, we have adapted Shroff and Mavridis definition of LCBI (Long Chain Branching Index) to our high molecular weight PE samples (R. N. Shroff and H. Mavridis, Macromolecules, 32, 8454, 1999). As explained by those authors, LCBI quantifies the rheological effect of LCB (enhancement of shear viscosity at low shear rates) for narrow and broad molecular weight distribution samples with sparse amount of LCB, that is LCB concentration typically too low to be detected by $^{13}C$ NMR (for homopolymers PE) or by solution techniques such as size exclusion chromatography (SEC) coupled with on-line viscosity or light scattering detectors.

LCB can be determined by SEC-VISCO as follows. SEC-VISCO experiments are conducted on a GPCV-200 instrument from Waters. The apparatus is composed of a set of three columns (two Shodex AT-806MS from Showa Denko and one Styragel HT6E from Waters) and of an injector maintained at a temperature of 145° C. and of a circulating pump. The PE is dissolved in filtered 1,2,4-trichlorobenzene stabilized with 1 g/l of BHT at a concentration of 0.1% at room temperature followed by heating to a temperature of 150° C. TCB without stirring. The solution is then filtered on a 0.5 μm mesh size filter using Polymer Laboratories PL-SP260 apparatus. About 400 μl of the filtered solution is finally injected in the columns at a flow rate of 1 ml/min and the eluted solution passes through two detectors: a differential refractometer and a viscometer. The parameter g' is then calculated for each eluted fraction with Empower software using equation $$g'_i = \frac{[\eta]_{i,branched}}{K(M_i)^\alpha} = \frac{[\eta]_{i,branched}}{[\eta]_{i,linear}}$$

In the above equation $g'_i$; is the ratio of intrinsic viscosity of the branched PE measured with on-line viscometer to the intrinsic viscosity of a linear PE eluted at the same $i^{th}$ elution volume with $K=4.167\ 10^{-4}$ dl/g and $\alpha=0.72$. The molecular weight of the linear PE is calculated with universal calibration' method using $K=1.035\ 10^{-4}$ dl/g and $\alpha=0.72$ for polystyrene (PS) standard having narrow MWD.

One can thus have a curve of $g'_i$ versus $M_i$ from all the eluted fractions. The parameter g' is the weight average value of all $g'_i$. The weight fraction i of the PE is detected with the differential refractometer.

$$g' = \frac{\sum_i w_i g'_i}{\sum_i w_i}$$

From g', it is then possible to derive LCB/10,000 C using several simplified hypotheses (trifunctional branch points, random distribution of branch lengths, uniform number of branches per molecule) as explained by Mirabella and Wild (F. M. Mirabella and L. Wild, in 'Determination of Long-Chain Branching Distributions of Polyethylenes', in 'Polymer Characterization', Amer. Chem. Soc. Symp. Series 227, 23, 1990).

LCB can be determined by rheology as follows. There are several methods to quantify LCB concentration for polyethylene with small amount of LCB.

1. DRI (Dow Rheology Index) has been introduced by S. Lai and G. W. Knight (ANTEC '93 Proceedings, Insite™ Technology Polyolefins (ITP)-New Rules in the Structure/Rheology Relationship of Ethylene & -Olefin Copolymers, New Orleans, La., May 1993; Antec '94, Dow Rheology Index (DRI) for Insite™ Technology Polyolefins (ITP): Unique structure-Processing Relationships, pp. 1814-1815) to quantify LCB in what they called substantially linear polyolefins (EP-A-0608369, U.S. Pat. No. 5,665,800). They define the Dow Rheology Index (DRI) as a new rheological measurement, which expresses a polymer's normalised relaxation time as the result of long chain branching. It was shown that a low value of the Dow rheological index is indicative of low or inexistant LCB. DRI is equal to 0 for linear mPE. DRI is not suitable to quantify LCB in PE resins with PI values ($M_w/M_n$) above roughly 4. Indeed DRI values of about 0.4 are found for ZN PE resins with no LCB and PI value 4-to-6. DRI is thus not suitable to gauge LCB in PE resins having broad MWD.
2. LCBI introduced by Shroff and Mavridis (R. N. Shroff and H. Mavridis, Macromolecules, 32, 8454 (1999)) is defined as the ratio of intrinsic viscosities of PE resins estimated by rheology to that determined via solution techniques.

$$LCBI = \frac{[\eta]_{rheo}}{[\eta]_{sol}} - 1$$

wherein $[\eta]_{rheo}$ and $[\eta]_{sol}$ are the intrinsic viscosities obtained respectively from rheology or via solution.

Thus, LCBI is zero for linear samples and is above zero for polyethylene containing long chain branching. A high level of LCB is encountered with LCBI above 0.8. Instead of determining intrinsic viscosity from the relative viscosity at 0.2 dg/min as explained in their publication, intrinsic viscosity value is calculated here via solution (expressed in dl/g) in terms of weight average molecular weight Mw (expressed in Da) obtained by size exclusion chromatography (SEC) with equation $$[\eta]_{sol} = 5.25 * 10^{-4} (M_w)^{0.76}$$

Zero shear viscosity $\eta_0$, expressed in Pa·s, is also related to the weight average molecular weight $M_w$, expressed in Da, by equation $$\eta_0 = 4.4927 * 10^{-16} (M_w)^{3.8412}$$

This equation is derived with 50 linear PE samples, both metallocene and ZN PE, with Mw ranging from 30 to 700 kDa, PI values from 2 to 25 and density from 0.87 to 0.965 g/cm$^3$.

Zero shear viscosity is estimated by fitting with Carreau-Yasuda flow curve ($\eta$-W) at a temperature of 190° C., obtained by oscillatory shear rheology on ARES equipment (manufactured by TA Instruments) in the linear viscoelasticity domain. Circular frequency (W in rad/s) varies from 0.05-0.1 rad/s to 250-500 rad/s and the shear strain is typically 10%.

The intrinsic viscosity inferred from rheology can thus be expressed as $$\eta = \frac{\eta_0}{(1 + (W*\tau)^b)^{((1-n)/b)}}$$

wherein parameters $\tau$, b and n are fitting parameters called respectively relaxation time, breadth parameter and power-law parameter.

The LCBI is thus rewritten as $$LCBI = \frac{0.572*(\eta_0)^{0.1979}}{5.25*10^{-4}(M_w)^{0.76}} - 1$$

3. Alternatively, it is possible to infer LCB concentration from zero shear viscosity values at a temperature of 190° C. using Colby and Janzen's equation (J. Janzen and R. H. Colby, J. Mol. Struct. 485-486, 569,1999) that gives two solutions for LCB concentration: one for PE resins with sparse LCB and one for high concentration of LCB (typically for LDPE).

4. In a way similar to that used for LCBI, a new method is used in the present invention to quantitatively determine LCB concentration through its effect on enhancement of zero-shear viscosity when LCB concentration is too low to be detected by conventional techniques. Enhancement of zero shear viscosity by LCB is quantified as follows:

$$g_{rheo}(PE) = \frac{M_w(SEC)}{M_w(\eta_0, MWD, SCB)}$$

In the present method, and similarly to g', $g_{rheo}$ is equal to one for linear PE and decreases with increasing amount of LCB.

Quite surprisingly, it is observed that significant improvement in zero shear viscosity prediction as function of molecular weight can be obtained by including effects of short chain branching (SCB) and molecular weight distribution (MWD), represented by the polydispersity index PI. Therefore in Mw values inferred from measurement of $\eta_0$, Mz, Mn and density corrections must also be included.

Molecular weight determined from $\eta_0$ alone, as is the case in prior art methods such as LCBI, are a factor of over 2 smaller than those derived by the present approach that includes corrections for SCB and polydispersity. Furthermore, a trend towards positive LCBI with decreasing density was identified for LCBI. No such trends was detected for $g_{rheo}$. Diagnostic for the presence of LCB can the be placed for lower LCB concentration with $g_{rheo}$. In practice, $g_{rheo}$ of 0.95 and below can be associated with the presence of LCB. For broad polydispersity indexes of at least 15 and for high molecular weight, the detection of LCB becomes less accurate with all approaches that use zero shear viscosity.

For the purpose of this invention, both LCBI, $g_{rheo}$ or Colby's method can be used but $g_{rheo}$ has been selected because of its higher sensitivity to detect LCB.

In order to increase the accuracy in estimating zero shear viscosity, a frequency sweep experiment having a typical range of 0.1-250 rad/s, is combined with a creep experiment, in order to extend the frequency range to values down to $10^{-4}$ s$^{-1}$ or lower, and taking the usual assumption of equivalence of angular frequency (rad/s) and shear rate.

In practice, a creep experiment is carried out at a temperature of 190° C. under nitrogen atmosphere with a stress level such that after 1200 s the total strain is less than 20%. The apparatus used is an ARG2 manufactured by TA instruments. Time-domain can be expanded while maintaining acceptable experimental times and avoiding oxidative degradation.

The resins of the present invention preferably have a density of from 0.87 to 0.975 g/cm$^3$, preferably the minimum density is of 0.910 g/cm$^3$, more preferably 0.925 g/cm$^3$. The maximum density is preferably of 0.965 g/cm$^3$, more preferably of 0.955 g/cm$^3$ and most preferably of 0.945 g/cm$^3$. The density is measured following the method of standard test ASTM 1505 at a temperature of 23° C. They have a high load melt index HLMI of from 0.001 to 500 dg/min. The minimum HLMI is preferably of 1 dg/min, more preferably of 3 dg/min. The maximum HLMI is preferably of to 250 dg/min, more preferably of 25 dg/min and most preferably of 5 dg/min. The melt index MI2 and the high load index HLMI are measured following the method of standard test ASTM D 1238 respectively under a load of 2.16 kg and 21.6 kg and at a temperature of 190° C. For pipes application the preferred densities range from 0.945 to 0.955 g/cm$^3$ with a HLMI of from 5 to 20 dg/min. For film applications, the preferred densities range from 0.915 to 0.935 g/cm$^3$ with HLMI of from 0.1 to 10 dg/min.

The molecular weight distribution is represented by the polydispersity index PI. It is of less than 7, preferably less than 6. The polydispersity index D1 defined as the ratio Mz/Mw is of less the 4 preferably of less than 3.5.

The long chain branching factor $g_{rheo}$ of the present resin, as determined from rheology, is smaller than that of a resin of same weight average molecular weight Mw obtained by a conventionally supported bridged unsubstituted bis-tetrahydroindenyl catalyst system $g_{rheoTHI}$, preferably less than 0.9 $g_{rheoTHI}$.

The long chain branching index g' determined by SEC-VISCO for the present resin is larger than 0.82, preferably larger than 0.90 indicating a low level of long chain branching, typically of less than 3 per 10000 carbon atoms.

This new family of single site resins exhibits very high melt strength. This is an important factor for example for bubble stability, sag resistance or maximum blow up ratio (BUR). It is a function of weight average molecular weight Mw, long chain branching facto $g_{rheo}$, polydispersity index PI, and density, with Mw and $g_{rheo}$ being the dominant factors.

The resins of the present invention preferably have a weight average molecular weight Mw of from 30 to 1000 kDa, preferably of from 50 to 700 kDa and more preferably of from 70 to 300 kDa.

EXAMPLES

List of Figures

FIG. 1 represents the extruder head pressure expressed in MPa as a function of melt strength expressed in N at a shear rate of 500 $s^{-1}$ and at a temperature of 190° C. for several resins, including resins additivated with polymer processing aid and resins having a bimodal molecular weight distribution. Extrusion was carried out on a Brabender equipped with Rheotens accessory.

The following resins have been used in the examples:

Resins R1 to R4 are monomodal resins prepared according to the present invention with THI catalyst component activated with a fluorinated activating support.

Resins R5 and R6 are monomodal commercial chromium oxide-based resins sold by TOTAL Petrochemicals respectively under the names of HF513 and HT514.

Resin R7b is commercial metallocene resin M2703 and resin R7 is the same resin as resin R7b without polymer processing aid.

Resin R8 is prepared with the same catalyst system as resins R1 to R4 deposited on a conventional support.

Resin R9 is a bimodal experimental resin prepared by physical blend of two conventional metallocene polyethylene resins having different molecular weights in order to obtain a final resin having a polydispersity index (Mw/Mn) similar to that of resins R1 to R4.

Example 1

Preparation of Activating Support S1

Silica support XPO2113 from Grace Davison was dried as follows:

20.458 g of silica were added at room atmosphere in a medium size activator. This activator was placed in a medium size oven. This oven was placed in stand-by at room temperature and under a nitrogen flow of 50 NL. The temperature ramp program was:
  50° C. to 100° C. in 1 hour under a N2 flow of 70 NL
  100° C. to 130° C. in 0.5 hour under a N2 flow of 70 NL
  130° C. to 450° C. in 1 hour under a N2 flow of 70 NL
  450° C. during 12 hours under a N2 flow rate of 70 NL
    cooling down from 450° C. to 50° C. in 2 hours under a flow rate of 70 NL In a 250 mL 4 necked round-bottomed flask 19.88 g of silica were placed with 100 mL of toluene. This suspension was stirred with a mechanic stirrer at 160 rpm. 70 mL of diethylaluminium fluoride (DEAF) solution 20% wt in isopar E was placed in a dropping funnel. This solution was added slowly to the suspension during 30 minutes. After this addition, the suspension was kept at room temperature for 1 hour. The impregnated silica was filtered on a filter 4 and washed 3 times with 100 mL of dried pentane.

The impregnated silica was dried by vacuum during 3 hours.

The full-impregnated support was placed in the dried activator—activator placed at 130° C. during 30 minutes, under a nitrogen flow 50 NL.

The temperature program was:
  50° C. to 130° C. in 1 hour under a N2 flow of 70 NL
  at 130° C. during 1 hour under a N2 flow of 70 NL
  130° C. to 450° C. in 1 hour under a N2 flow of 70 NL
  at 450° C. during 4 hours under a N2 flow of 70 NL
  450° C. to 130° C. in 2 hours under a N2 flow of 70 NL
  at 130° C. during 1 hour under Air flow of 70 NL
  130° C. to 600° C. in 1 hour under a Air flow of 70 NL
  at 600° C. during 8 hours under a Air flow of 70 NL
  600° C. to 50° C. in 2 hours under a N2 flow of 70 NL After the complete cooling down of the system, traces of support were observed on the top of the activator.

Example 2

Preparation of Activating Support S2

P6 Silica from FUJI was dried as follows:

74.480 g of silica were added at room atmosphere in a medium size activator. This activator was placed in a medium size oven. This oven was placed in stand-by at room temperature and under a nitrogen flow 50 NL. The temperature ramp program was:
  50° C. to 100° C. in 1 hour under a N2 flow of 70 NL
  100° C. to 130° C. in 0.5 hour under a N2 flow of 70 NL
  130° C. to 450° C. in 1 hour under a N2 flow of 70 NL
  450° C. during 12 hours under a N2 flow rate of 70 NL
    cooling down from 450° C. to 50° C. in 2 hours under a flow rate of 70 NL In a 500 mL 4 necked round-bottomed flask 19.88 g of silica were placed with 150 mL of toluene. This suspension was stirred with a mechanic stirrer at 170 rpm. 36 mL of DEAF solution 20% wt in isopar E was placed –51.84 mmol of DEAF, in a dropping funnel. This solution was added slowly to the suspension during 30 minutes. After this addition, the suspension was kept at room temperature for 1 hour. The impregnated silica was filtered on a filter 4 and washed 3 times with 100 mL of dried pentane.

The impregnated silica was dried by vacuum during 3 hours.

The full-impregnated support was placed in the dried activator—activator placed at 130° C. during 30 minutes, under a nitrogen flow 50 NL.

The temperature program is:
  50° C. to 130° C. in 1 hour under a N2 flow of 70 NL
  at 130° C. during 1 hour under a N2 flow of 70 NL
  130° C. to 450° C. in 1 hour under a N2 flow of 70 NL
  at 450° C. during 4 hours under a N2 flow of 70 NL
  450° C. to 130° C. in 2 hours under a N2 flow of 70 NL
  at 130° C. during 1 hour under Air flow of 70 NL
  130° C. to 450° C. in 1 hour under a Air flow of 70 NL
  at 450° C. during 8 hours under a Air flow of 70 NL
  450° C. to 50° C. in 2 hours under a N2 flow of 70 NL After the complete cooling down of the system, traces of support were observed on the top of the activator.

Example 3

Preparation of Resin R1

In a glove box, 2 mL of TIBAL (10% solution in hexane) and 1.52 mg of rac-Et(THInd)$_2$ZrF$_2$ and were mixed in a syringe. This solution was then deposited onto 240.58 mg of activating support S1. The support instantaneously turned yellow while the supernatant remained colourless. After a period of time of 5 minutes, the suspension was injected in a 3.5 L Buchi type reactor containing 2 L of liquid isobutane, 2.44% wt of 1-hexene and 6% of ethylene (for an overall pressure of 23.6 bar), 1 mL of TiBAl as scavenger and it was maintained at a temperature of 85° C. Polymerisation was carried out during a period of time of sixty minutes and 321 g of resin R1 were retrieved.

Example 4

Preparation of Resin R2

In a glove box, 2 mL of TIBAL (10% solution in hexane) and 1.462 mg of rac-Et(THInd)2ZrF2 and were mixed in a syringe. This solution was then deposited onto 240.225 mg of activating support S2. The support instantaneously turned yellow while the supernatant remained colourless. After a period of time of 5 minutes, the suspension was injected in a 3.5 L Buchi type reactor containing 2 L of liquid isobutane, 2.44% wt of 1-hexene and 6% of ethylene (for an overall pressure of 23.6 bar), 1 mL of TiBAl as scavenger and it was maintained at a temperature of 85° C. Polymerization was carried out during a period of time of thirty minutes and 237 g of resin R2 were retrieved.

Example 5

Preparation of Resin R3

In a glove box, 2 mL of TIBAL (10% solution in hexane) and 1.902 mg of rac-Et(THInd)$_2$ZrF$_2$ and were mixed in a syringe. This solution was then deposited onto 239.547 mg of activating support of S2. The support instantaneously turned yellow while the supernatant remained colourless. After a period of time of 5 minutes, the suspension was injected in a 3.5 L Buchi type reactor containing 2 L of liquid isobutane, 6% of ethylene (for an overall pressure of 27.7 bar), 1 mL of TiBAl as scavenger and 0.5 NL of hydrogen and it was maintained at a temperature of 95° C. Polymerisation was carried out during a period of time of thirty minutes and 298 g of resin R3 were retrieved.

Example 6

Preparation of Activating Support S3 and Resin R4

Another activating support S3 similar to support S2 was prepared at larger pilot scale. An overall 3.5 kg of DEAF impregnated silica sample was activated in an air-fluidised bed during 36 hours.

2.3 kg of activating support S3 was dispersed in 42 Liters of isobutene with a 1718.4 g solution of rac-Et(THInd)$_2$ZrCl$_2$/TEAl/1-hexene (1 eq/18 eq/174 eq) in order to obtain a final catalyst with 0.8% wt of metallocene.

This suspension was fed in an isobutane double slurry loop reactor. After stabilisation, reactors conditions were as described in Table 1:

TABLE 1

| | Loop 1 | Loop 2 |
|---|---|---|
| Temperature (in ° C.) | 90 | 90 |
| Cocatalyst type | TiBAl | TiBAl |
| Cocatalyst (in ppm) | 150 | 100 |
| Isobutane (in kg/h) | 50 | 40 |
| Ethylene (in kg/h) | 18 | 10 |
| 1-hexene (in kg/h) | 1.5 | 1.7 |
| H2 (in NL/h) | 4.3 | 4 |
| Anti-fouling agent | Symperonic | Symperonic |
| Anti-fouling (in ppm) | 2.4 | 3 |
| Solid content (in %) | 24.5 | 21 |
| Polymer production (in kg/h) | — | 24 |

Resin R4 was obtained.

Tables 2 and 3 display respectively the characteristics and properties of resins R1 to R9.

TABLE 2

| Resin | Density g/cm$^3$ | HLMI dg/min | Mn kDa | Mw kDa | Mz kDa | PI | D1 |
|---|---|---|---|---|---|---|---|
| R1 | 0.937 | 10.0 | 25.9 | 130 | 363 | 5.02 | 2.8 |
| R2 | 0.937 | 6.5 | 26.1 | 142 | 407 | 5.44 | 2.9 |
| R3 | 0.941 | 3.8 | 34.7 | 192 | 579 | 5.53 | 3.0 |
| R4 | 0.934 | 5.0 | 24.0 | 138 | 390 | 5.75 | 2.8 |
| R5 | 0.934 | 13.0 | 15.7 | 236 | 2643 | 15.0 | 11.2 |
| R6 | 0.938 | 14.0 | 15.7 | 215 | 2144 | 13.7 | 10.0 |
| R7 | 0.927 | 10.0 | 41.9 | 101 | 189 | 2.41 | 1.9 |
| R7b | 0.927 | 10.0 | 41.9 | 101 | 189 | 2.41 | 1.9 |
| R8 | 0.942 | 9.7 | 34.5 | 117 | 282 | 3.4 | 2.4 |
| R9 | 0.940 | 11.0 | 28.4 | 154 | 532 | 5.42 | 3.5 |

TABLE 3

| Resin | g' | g$_{rheo}$ | SR$_{ETA}$ | MS N | P MPa | IS 23 kJ/m$^2$ | IS −30 kJ/m$^2$ | ESCR h | FNCT h |
|---|---|---|---|---|---|---|---|---|---|
| R1 | 0.99 | 0.48 | 135 | 0.35 | 18.6 | 55.1 | 10.2 | >1500 | 1900 |
| R2 | 1.0 | 0.47 | 141 | 0.39 | 18.8 | 74.7 | 18 | >1500 | >2015 |
| R3 | 1.01 | 0.32 | 150 | 0.63 | 23.1 | 59.9 | 26 | >1500 | 17 |
| R4 | 0.99 | 0.47 | 138 | 0.53 | 20.9 | | | | |
| R5 | 0.94 | 0.81 | 80 | 0.45 | 19 | 37.2 | 6.5 | >2000 | >1500 |
| R6 | 1.0 | 0.8 | 79 | 0.44 | 18.5 | 20.7 | 6.1 | | 232 |
| R7 | 1.0 | 0.69 | 35 | MF | MF | | | | |
| R7b | 1.0 | 0.69 | 35 | 0.26* | * | 67 | 24.2 | >701 | |

TABLE 3-continued

| Resin | g' | $g_{rheo}$ | $SR_{ETA}$ | MS N | P MPa | IS 23 kJ/m$^2$ | IS −30 kJ/m$^2$ | ESCR h | FNCT h |
|---|---|---|---|---|---|---|---|---|---|
| R8 | 1.0 | 0.55 | 68 | MF | MF | 30 | 20.2 | 36 | 1.4 |
| R9 | 0.97 | 0.65 | 84 | 0.24 | 19.5 |  | 10 | 90 | 5.3 |

In this Table:
$SR_{ETA}$ is the ratio of shear viscosities at 0.1 to 500 rad/s,
MS is the melt strength at 190 degree C. and 500 s−1,
p is the pressure at 190 degree C. and 500 s−1
IS 23 is the impact strength at 23 degree C.,
IS −30 is the impact strength at −40 degree C.,
ESCR is measured at 50 degree C with 10% surfactant (IGEPAL CO630 produced by Rhodia),
FNCT is measured at 4 MPa, 50 degree C and 0.5 wt % (COGNIS MARANIL A55),
*means unstable extrusion with incipient melt fracture,
MF means melt fracture.

The resins of the present invention exhibit very high impact strength as can be seen Table 3. Their Izod impact strength is comparable to that of resins R7 and R8 of equivalent HLMI and density and much larger than that of chromium oxide-based resins of similar characteristics. Izod impact is measured following the method of standard test ASTM D 256.

As can be seen in Table 3, the resins of the present invention exhibit very good ESCR and FNCT resistances. Their resistance is much higher than that of THI resins of equivalent characteristics and equal or larger than those of chromium oxide-based resins of similar characteristics.

As expected, bimodal resin R9 prepared with conventional support performs better than corresponding resin R8. However, resins of this invention show even better performance than bimodal resins. ESCR is measured following the method of standard test ASTM D 1690 and FNCT following ISO 16770. In order to speed up the rupture times, Maranil A55 (Cognis) (0.5 wt %) was used.

The polyethylene resins of the present invention satisfy the relationship between melt strength MS and extruder head pressure p $$MS \geq 0.021\, p - 0.13$$

wherein melt strength MS is expressed in N and extruder head pressure p is expressed in MPa, when processed in a rheological extruder through a die with L/D of 30:2 at a rate of 500 s$^{-1}$ and at temperature of 190° C. Melt strength is measured with a Göttfert Rheotens equipment.

Preferably it is given by the relationship $$MS \geq 0.03\, p - 0.21 \text{ under the same conditions.}$$

The melt strength as a function of extruder head pressure is represented in FIG. 1 for the resins of the present invention and for several other polyethylene resins. In this figure, the resins that process best in extrusion, have low head pressure at a given throughput. The resins that can be easily transformed in the melt by a unit process involving an elongational strain such as for example blow moulding, film blowing or foam expansion have high melt strength and low extruder head pressure.

Most actual commercial metallocene-prepared polyethylene (mPE) resins containing no polymer processing aids (PPA), cannot be processed at a shear rate of 500 s$^{-1}$. They are linear resins without long chain branching (LCB) and they exhibit melt fracture. They are characterised by high extruder head pressures, low values of melt strength and melt fracture. The best prior art resins exhibit melt fracture and can barely be extruded at a shear rate of 500 s$^{-1}$. They have sparse amount of LCB and they are characterised by relatively high extruder head pressures, low values of melt strength and melt fracture.

Both melt strength and extrusion head pressure decrease when bis-indenyl catalyst system is used. The resulting mPE resins have a high concentration of long chain branches and a polydispersity index (Mw/Mn) of at least 5 with a shoulder in the SEC diagram that is due to the presence of isomers. High LCB concentration means LCB/10,000 C>2-3 or g'<0.88 as revealed by SEC-VISCO analysis. This also means that zero shear viscosity is much larger than that of linear mPE of same weight average molecular weight $M_w$. Such mPE resins have been disclosed for example in WO99/35174, EP-A-0676421 A1 or EP-A-743237.

Processability can compare with that of monomodal Ziegler-Natta polyethylene (ZNPE) resins but the mPE resins have better impact strength and optics than the ZNPE resins.

The resins of the present invention having a high load melt index HLMI ranging between 7 and 10 dg/min and a most preferred density of from 0.930 to 0.940 g/cm$^3$ process nearly like chromium oxide-based resins and with some fine-tuning they can compete with low density polyethylene (LDPE) resins.

The resins of the present invention present no melt fracture at typical shear rates used in blow moulding applications.

Gain in processing can be obtained by adding polymer processing aid or by using resins having a bimodal molecular weight distribution, as is the case for all other resins.

FIG. 1 also illustrates the gain in processing obtained by adding PPA to commercial metallocene and non-metallocene polyethylene resins or by using resins having a bimodal molecular weight distribution such as for example bimodal ZNPE. The drop of extruder head pressure obtained by adding PPA is smaller for resins having a broad molecular weight distribution than for resins having a narrow MWD of from 2 to 3.5. Processing of resins according to the present invention used without PPA compares favourably with metallocene resins additivated with PPA or with bimodal resins. Furthermore, no melt fracture occurred during extrusion with the resin of the present invention even though they had a high load melt index HLMI of less than 10 dg/min, in sharp contrast to resin R7bis, which is a polyethylene resin having a density of 0.923 g/cm$^3$, a high load melt index HLMI of 10 dg/min and containing PPA. Resin R7bis exhibits signs of melt fracture at 500 s−1 under same processing conditions. Without processing aid, gross melt fracture occurs precluding normal processing.

From Table 3, it appears that shear thinning, defined as the ratio $SR_{ETA}$ of shear viscosities at 0.1 to 500 rad/s, is always larger for resins of this invention compared to mPE and Cr resins of similar HLMI.

The invention claimed is:

1. A polymerization process comprising:
   contacting an ethylene monomer with an active catalyst system comprising a fluorinated activating support and a metallocene component of formula:

$$R''(H_4Ind)_2MQ_2 \qquad (I)$$

wherein $(H_4Ind)$ is substituted or unsubstituted tetrahydroindenyl; R" is a structural bridge between the two indenyls to impart stereorigidity that comprises a $C_1$-$C_4$ alkylene radical, a dialkyl germanium or silicon or siloxane, or an alkyl phosphine or amine radical, wherein the bridge is substituted or unsubstituted; M is a metal Group 4 of the Periodic Table; and Q is hydrogen, halogen, hydrocarbyl or hydrocarboxy to form polyethylene, wherein the polyethylene exhibits a melt strength $MS \geq 0.021\ p - 0.131$, and wherein MS is melt strength expressed in N and p is extruder head pressure expressed in MPa; and
   processing the polyethylene in a rheological extruder through a die to form an extruded polyethylene, wherein the extruded polyethylene exhibits a long chain branching index g' determined by SEC-VISCO larger than 0.90 and a polydispersity index (Mw/Mn) of at most 7 when the die has a L/D of 30:2 at a rate of 500 s$^{-1}$ and at temperature of 190° C.

2. The process of claim 1, wherein the polyethylene further exhibits a shear thinning index $SR_{ETA}$, defined as the ratio of shear viscosity at 0.1 rad/s to that at 500 rad/s, greater than that of polyethylene prepared with a conventionally supported bridged bistetrahydroindenyl catalyst system having the same HLMI value.

3. The process of claim 1, wherein the polyethylene further exhibits a rheology long chain branching index $g_{rheo}$ smaller than that of polyethylene resins prepared with a conventionally supported bridged unsubstituted bistetrahydroindenyl catalyst system having the same weight average molecular weight Mw, wherein $g_{rheo}$ is defined by the ratio $$g_{rheo}(PE) = \frac{M_w(SEC)}{M_w(\eta_0, MWD, SCB)}$$

and wherein a smaller $g_{rheo}$ indicates a higher level of long chain branching.

4. The process of claim 1, wherein the polyethylene further exhibits a polydispersity index (Mz/Mw) of at most 4.

5. The process of claim 1, wherein the polyethylene further exhibits an impact strength larger than that of polyethylene resins of same melt index HLMI and same density prepared with a chromium oxide-based catalyst system and with a high pressure process.

6. The process of claim 1, wherein the polyethylene further exhibits an Environmental Stress Crack Resistance (ESCR) larger than that of polyethylene resins of same density and same melt index HLMI prepared respectively with a chromium oxide-based catalyst system and with a conventionally supported bridged unsubstituted bistetrahydroindenyl catalyst system.

7. The process of claim 1, wherein the polyethylene further exhibits a Full Notch Creep Test (FNCT) resistance larger than that of polyethylene resins of same density and same melt index HLMI prepared either with a chromium oxide-based catalyst system or with a conventionally supported bridged unsubstituted bistetrahydroindenyl catalyst system.

8. The process of claim 1, wherein the polyethylene further exhibits a rheology long chain branching index $g^{rheo}$ that is of at most 9/10 of that of a polyethylene resin prepared with a conventionally supported bridged unsubstituted bistetrahydroindenyl catalyst system having the same weight average molecular weight Mw.

9. The process of claim 1, wherein the polyethylene further exhibits a melt strength that is given by formula $MS \geq 0.03\ p - 0.21$, wherein the melt strength is expressed in N and the pressure is expressed in MPa.

10. The process of claim 1, wherein the polyethylene further exhibits a density of from 0.87 to 0.965 g/cm$^3$.

11. The process of claim 1, wherein the polyethylene further exhibits a high load melt index HLMI of from 0.001 to 500 dg/min.

12. The process of claim 1, wherein the active catalyst system comprises ethylene bis tetrahydroindenyl zirconium dichloride.

13. The process of claim 1, wherein the fluorinated activating support is prepared by providing a support prepared from one or more porous mineral oxides; optionally heating the support under inert gas; functionalising the support with a solution containing an alkylating agent; heating the functionalised support under an inert gas and then under oxygen; fluorinating the support with a solution containing a fluorinating agent; and retrieving an active fluorinated support.

* * * * *